United States Patent
Chen et al.

(10) Patent No.: US 10,008,206 B2
(45) Date of Patent: Jun. 26, 2018

(54) VERIFYING A USER

(75) Inventors: Fang Chen, Eveleigh (AU); Bo Yin, Eveleigh (AU); Kim MacDonald, Eveleigh (AU)

(73) Assignee: NATIONAL ICT AUSTRALIA LIMITED, Eveleigh, NSW (AU)

(*) Notice: Subject to any disclaimer, the term of this patent is extended or adjusted under 35 U.S.C. 154(b) by 243 days.

(21) Appl. No.: 13/551,313

(22) Filed: Jul. 17, 2012

(65) Prior Publication Data

US 2013/0185071 A1  Jul. 18, 2013

(30) Foreign Application Priority Data

Dec. 23, 2011  (AU) ................................ 2011905420

(51) Int. Cl.
*G10L 15/00* (2013.01)
*G10L 17/00* (2013.01)
*G10L 21/00* (2013.01)
*H04L 9/00* (2006.01)
*H04M 3/00* (2006.01)
*H04N 7/00* (2011.01)
*H04Q 7/00* (2006.01)
(Continued)

(52) U.S. Cl.
CPC .............. *G10L 17/04* (2013.01); *G06F 21/32* (2013.01); *G06K 9/00892* (2013.01); *G06K 9/6297* (2013.01)

(58) Field of Classification Search
USPC ......................................................... 704/244
See application file for complete search history.

(56) References Cited

U.S. PATENT DOCUMENTS 5,815,197 A * 9/1998 Kakii ..................... H04N 7/144
                                                348/14.08
5,915,001 A * 6/1999 Uppaluru .................. 379/88.22
(Continued)

FOREIGN PATENT DOCUMENTS

WO         00/58947        10/2000
WO      2010/066310         6/2010
(Continued)

OTHER PUBLICATIONS

"Investigation and Evaluation of Voice Stress Analysis Technology," Darren Haddad, Sharon Walter, Roy Ratley and MEgan Smith, Air Force Research Laboratory, Information Directorate, Rome Research Site, Rome, New York, In-House Technical Memorandum, Nov. 2001.*
(Continued)

*Primary Examiner* — Fariba Sirjani

(57) ABSTRACT

Verifying a user, such as, but not limited to, a user who answered questions for an unproctered test for employment. A representation of a transition pattern is stored (200). Time series voice data is received from a user responding to a sequence of questions (72) having multiple levels of difficulty. The transition pattern in the voice data (200) is based on a plurality of comparisons (503) of subsets (500) of the voice data corresponding to responses to questions having one or more different levels of difficulty. A further transition pattern (200) is determined from voice data in the same way but based on a shorter sequence of questions (78). The user is verified based on a comparison (78) of this further transition pattern to a previously stored transition pattern.

13 Claims, 7 Drawing Sheets

(51) Int. Cl.
*G10L 17/04* (2013.01)
*G06K 9/00* (2006.01)
*G06F 21/32* (2013.01)
*G06K 9/62* (2006.01)

(56) References Cited

U.S. PATENT DOCUMENTS

| | | | | |
|---|---|---|---|---|
| 6,119,084 | A * | 9/2000 | Roberts | G10L 17/20 704/243 |
| 6,411,933 | B1 * | 6/2002 | Maes | G06K 9/00892 704/270 |
| 6,632,174 | B1 * | 10/2003 | Breznitz | A61B 5/16 434/236 |
| 6,879,968 | B1 * | 4/2005 | Hayakawa | G10L 17/08 704/E17.008 |
| RE38,884 | E * | 11/2005 | Kakii | H04N 7/144 348/14.08 |
| 6,973,575 | B2 | 12/2005 | Arnold | |
| 7,054,811 | B2 * | 5/2006 | Barzilay | G06Q 30/06 704/246 |
| 7,321,855 | B2 * | 1/2008 | Humble | G10L 17/26 704/270 |
| 7,400,879 | B2 * | 7/2008 | Lehaff | H04M 3/527 379/265.01 |
| 7,490,043 | B2 * | 2/2009 | Tavares | G10L 17/08 382/115 |
| 7,536,304 | B2 * | 5/2009 | Di Mambro et al. | 704/273 |
| 7,583,197 | B2 * | 9/2009 | Wesby Van Swaay | H04M 1/05 340/5.61 |
| 7,636,855 | B2 * | 12/2009 | Applebaum et al. | 713/186 |
| 7,716,055 | B1 | 5/2010 | McIntosh et al. | |
| 7,933,771 | B2 * | 4/2011 | Chang | G10L 21/02 704/231 |
| 8,185,646 | B2 * | 5/2012 | Headley | 709/229 |
| 8,239,677 | B2 * | 8/2012 | Colson | G06F 21/34 705/51 |
| 8,332,223 | B2 * | 12/2012 | Farrell et al. | 704/246 |
| 8,407,762 | B2 * | 3/2013 | Bidare | H04L 9/321 726/2 |
| 8,412,530 | B2 * | 4/2013 | Pereg et al. | 704/270 |
| 8,590,018 | B2 * | 11/2013 | Thavasi | G06F 21/31 726/2 |
| 8,818,810 | B2 * | 8/2014 | Weng et al. | 704/246 |
| 9,002,706 | B2 * | 4/2015 | Lopez | B66B 13/26 704/246 |
| 9,378,366 | B2 * | 6/2016 | Tegreene | G06F 21/554 |
| 2004/0162726 | A1 | 8/2001 | Chang | |
| 2002/0190124 | A1 | 12/2002 | Piotrowski | |
| 2003/0046083 | A1 * | 3/2003 | Devinney et al. | 704/273 |
| 2005/0089172 | A1 * | 4/2005 | Fujimoto | 380/275 |
| 2005/0969906 | | 5/2005 | Barzilay | |
| 2005/0171774 | A1 * | 8/2005 | Applebaum | G10L 17/12 704/250 |
| 2005/0182618 | A1 * | 8/2005 | Azara | G06F 17/279 704/9 |
| 2005/0288820 | A1 * | 12/2005 | Wu | G06F 3/0481 700/264 |
| 2005/0288930 | A1 * | 12/2005 | Shaw | G10L 15/26 704/257 |
| 2006/0021003 | A1 * | 1/2006 | Fisher et al. | 726/1 |
| 2006/0102717 | A1 * | 5/2006 | Wood | G06Q 10/10 235/382 |
| 2006/0104348 | A1 * | 5/2006 | Chen et al. | 375/240.01 |
| 2007/0067159 | A1 * | 3/2007 | Basu | G10L 15/26 704/200 |
| 2007/0094021 | A1 | 4/2007 | Bossemeyer, Jr. et al. | |
| 2007/0147592 | A1 * | 6/2007 | Ikumi et al. | 379/88.02 |
| 2007/0177017 | A1 * | 8/2007 | Kyle | A61B 5/01 348/207.99 |
| 2007/0255564 | A1 | 11/2007 | Yee et al. | |
| 2008/0222722 | A1 * | 9/2008 | Navratil | H04L 63/104 726/21 |
| 2008/0306811 | A1 * | 12/2008 | Goldman | G06Q 10/06311 705/7.14 |
| 2010/0091953 | A1 | 4/2010 | Kim et al. | |
| 2010/0161327 | A1 * | 6/2010 | Chandra | G10L 13/06 704/235 |
| 2010/0217097 | A1 * | 8/2010 | Chen et al. | 600/301 |
| 2010/0228656 | A1 * | 9/2010 | Wasserblat et al. | 705/35 |
| 2011/0136085 | A1 * | 6/2011 | Leroy | G06Q 10/10 434/236 |
| 2011/0162067 | A1 * | 6/2011 | Shuart et al. | 726/19 |
| 2011/0207099 | A1 * | 8/2011 | Chen et al. | 434/236 |
| 2011/0223576 | A1 * | 9/2011 | Foster et al. | 434/362 |
| 2012/0130714 | A1 * | 5/2012 | Zeljkovic | G10L 17/24 704/235 |
| 2012/0323796 | A1 * | 12/2012 | Udani | G06Q 50/24 705/80 |
| 2013/0006626 | A1 * | 1/2013 | Aiyer | G06F 21/32 704/235 |
| 2013/0097682 | A1 * | 4/2013 | Zeljkovic | H04L 9/3231 726/7 |
| 2014/0347265 | A1 * | 11/2014 | Aimone | G09G 3/003 345/156 |
| 2015/0096002 | A1 * | 4/2015 | Shuart | G06F 21/00 726/7 |

FOREIGN PATENT DOCUMENTS

| | | |
|---|---|---|
| WO | 2011/035271 | 3/2011 |
| WO | 2011/088415 | 7/2011 |

OTHER PUBLICATIONS

John Sweller et al., "Cognitive Architecture and Instructional Design", Educational Psychology Review, vol. 10, No. 3, 1998, pp. 251-296.

R. Huang et al, "Dialect Classification on Printed Text Using Perplexity Measure and Conditional Random Fields", IEEE, 2007, pp. IV-993-IV-996.

F. Bimbot et al., "An Alternative Scheme for Perplexity Estimation", IEEE, 1997, pp. 1483-1486.

P.E. Kenne et al., "Topic change and local perplexity in spoken legal dialogue", Nov. 1996, IEEE Xplore Conference: Spoken Language, pp. 721-723.

* cited by examiner

VERIFYING A USER

TECHNICAL FIELD

This disclosure concerns verifying a user, such as but not limited to, verifying a user who answered questions that comprise a test that was unproctered. Aspects of the invention include computerised method, software and hardware.

BACKGROUND ART

Unproctored (unsupervised) testing of people is suitable in some situations, for example assessing candidates for employment or students for grading purposes. This has occurred because there are some significant cost saving in unproctored testing when compared to proctored (supervised and typically onsite) testing. However the cost saving comes with some disadvantages.

In particular, the unproctored testing process is more open to abuse than proctored testing. For example, cheating is made easier by having someone else perform the test on the person's behalf. This is unfair to the remaining candidates or students and at the same time lessens the accuracy and therefore value of the tests for the organisation relying on the testing results.

SUMMARY OF THE INVENTION

In a first aspect there is provided a computer implemented method to determine verifying data of a user, the system comprising:
 receiving time series voice data from the user responding to a sequence of questions having multiple levels of difficulty;
 determining a transition pattern in the voice data based on a plurality of comparisons of subsets of the voice data corresponding to responses to questions having one or more different levels of difficulty; and
 storing a representation of the transition pattern for use in future verification of user.

It is an advantage of the method that transition patterns can be determined that can then be suitably used to later verify the same user. This makes collecting the verification data convenient.

Impersonation is a common cheating strategy. Existing modes of verification separate the testing and verification and therefore can be more easily gamed. It is an advantage that by combining testing and verification data collection so that an integrated input is generated by the user makes it more difficult to cheat.

It is a further advantage that the transition patterns are free from bias based on the user's native tongue.

The sequence of questions also a test of the user suitability or qualification to a role that the user is being tested for. The test may be unproctored. Security measures exist for unproctored testing but they impose an additional burden on the user. Many of these security measures cause users to abandon the process. It is an advantage that verification of the user can be implemented passively, that is generating the verification data from the actual suitability testing (that may be unproctored) making it less intimidating than existing security measures. This in turn leas to a reduced abandonment rate.

The method of determining the transition pattern comprises determining from each subset one or more of the following features:
 pitch,
 first formant,
 second formant,
 third formant,
 glottal excitation, and
 place of articulation.

The comparison of subsets may be based on a comparison of the features of the subsets, and the method may comprise determining a probability distribution function of one or more features of each subset.

The comparison of subsets may be based on a distance measure, such as Euclidean distance, of the respective probability distribution function.

Where the questions are in substantially increasing or decreasing order of difficulty, the distance measures are combined to form a time series vector. The question in increasing or decreasing order may form all or part of a test.

The data representative of the transition pattern may include a model of the transition pattern, such as a probability model.

The method may further comprise receiving further data from the user while responding to the questions being one or more of:
 time series data representative of mouse, stylus or other pointing device movements, including pressure information;
 time series data representative of alphanumeric key input; and
 time series data representative of biological features of the user.

The method may further comprise extracting features from the further data and determining probability and distance measures of these features, wherein the storing step also includes storing data representative of these probability and distance measures.

The method further comprises presenting the sequence of questions to the user.

The sequence of questions may be questions in a cognitive ability test.

In a second aspect the invention is software, that is computer readable instructions recorded on computer readable media that when executed by a computer causes it to operate in accordance with the method described above.

In a third aspect, there is provided a computer system for generating verifying data of a user, the system comprising:
 sound capture device to receive time series voice data from the user responding to a sequence of questions multiple levels of difficulty;
 a voice assessment module to determine a transition pattern in the voice data based on a plurality of comparisons of subsets of the voice data corresponding to responses to questions having or more different levels of difficulty; and
 a data store to store a representation of the transition pattern for use in future verification of user.

The system may further comprise a testing module to present the sequence of questions tot he user.

In a fourth aspect there is provided a computer implemented method for verifying a user as having previously responded to a first sequence of questions, the method comprising:
 receiving time series voice data from the user responding to a second sequence of having multiple levels of difficulty;
 determining a transition pattern in the voice data based on a plurality of comparisons of subsets of the voice data corresponding to responses to questions having one or more different levels of difficulty; and verifying the user based on a comparison of the transition pattern to a previously stored representation of a transition pattern determined from the responses to the first sequence of questions.

Existing verification methods are typically based on statistical interference in a re-test scenario. That is, the user is asked to repeat the unproctored test in a proctored setting and the answers provided by the user are statistically compared to the original answers. It is an advantage of this method that the first and second cognitive ability test can be different enabling the verification phase to also provide more information on the cognitive ability of the user. Further, the second test can be significantly shorter that the first cognitive ability test. Therefore it also an advantage that this method is less time-intensive than the prior art.

The step of verifying the user may comprise determining a likelihood score that that the user previously responded to the first sequence of questions.

The method may further comprise determining the verifying data, being the representation of the transition pattern, as described above.

The method of determining a transition pattern in the voice data may be the same as described above.

The method may further comprise receiving further data from the user while responding to the second sequence of questions being one or more of:
time series data representative of mouse, stylus or other pointing device movements, including pressure information,
time series data representative of alphanumeric key input; and
time series data representative of biological features of the user.

The comparison of the transition pattern to the previously stored representation of a transition pattern may be based on an assessment of whether the transition patterns share a similar statistical distribution.

In a fifth aspect the invention is software, that is computer readable instructions recorded on computer readable media that when executed by a computer causes it to operate in accordance with the method described directly above.

In a sixth aspect there is provided a computer system to verify a user as having previously performed a first cognitive ability test, the system comprising:
sound capture device to receive time series voice data from the user responding to a sequence of questions that comprise a second cognitive ability test, wherein the questions expose the user to different levels of cognitive load;
a voice assessment module to determine a transition pattern in the voice data based on a plurality of comparisons of subsets of the voice data corresponding to responses to questions having one or more different levels of difficulty; and
a verification module to verify the user based on a comparison of the transition pattern to a previously stored representation of a transition pattern determined from the responses to the first sequence of questions.

Of course, where suitable, optional features of the first aspect described above are also optional features of the remaining aspects also described here.

BRIEF DESCRIPTION OF THE DRAWINGS

Non-limiting examples will now be described with reference to the following drawings, in which.

BEST MODES

An example of testing users, in this case candidates for employment, will now be described. In this example there are multiple candidates that will be assessed for suitability for the employment on offer. The assessment includes a sequence of tests which at least includes:
Unproctored cognitive ability testing (CAT)
Proctored verification CAT
Interview Typically, after each assessment only some of the candidates will proceed to the next assessment. The assessments are specifically provided in this order as the order reflects increasing costs. As a result the more costly tests are applied to fewer candidates.

Figure 1:
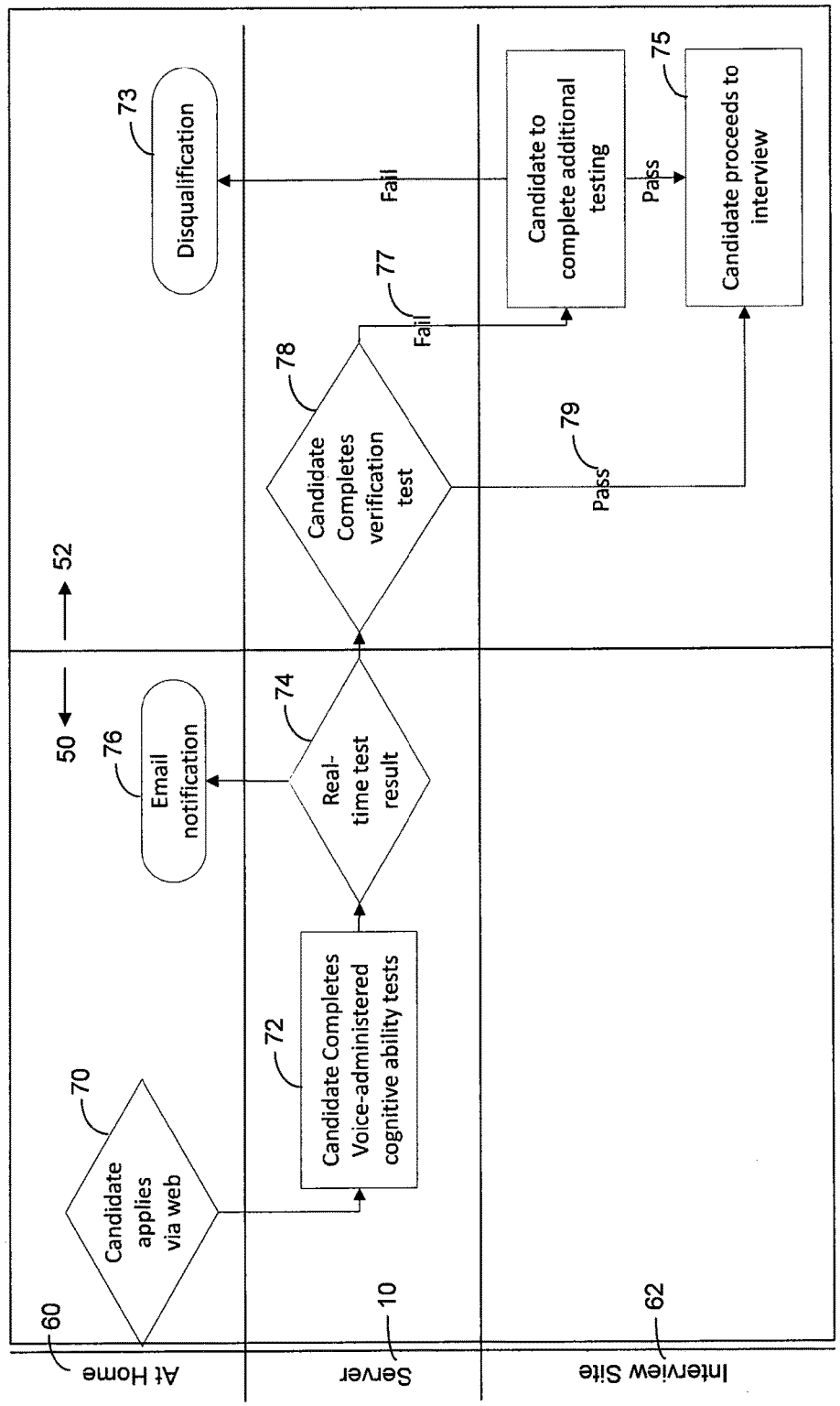
FIG. 1 is a flow diagram of one example.

Referring also to FIG. 1, there are two main stages for testing a candidate in this example. The first stage 50 is completion of the unproctored CAT by the candidate that also generates the identity signature. The second stage 52 is the interview which before or after the proctored verification CAT is completed by the candidate so that the candidate can be verified against the identity signature as the person who participated in the first stage 50 and therefore completed the unproctored CAT.

Figure 2:
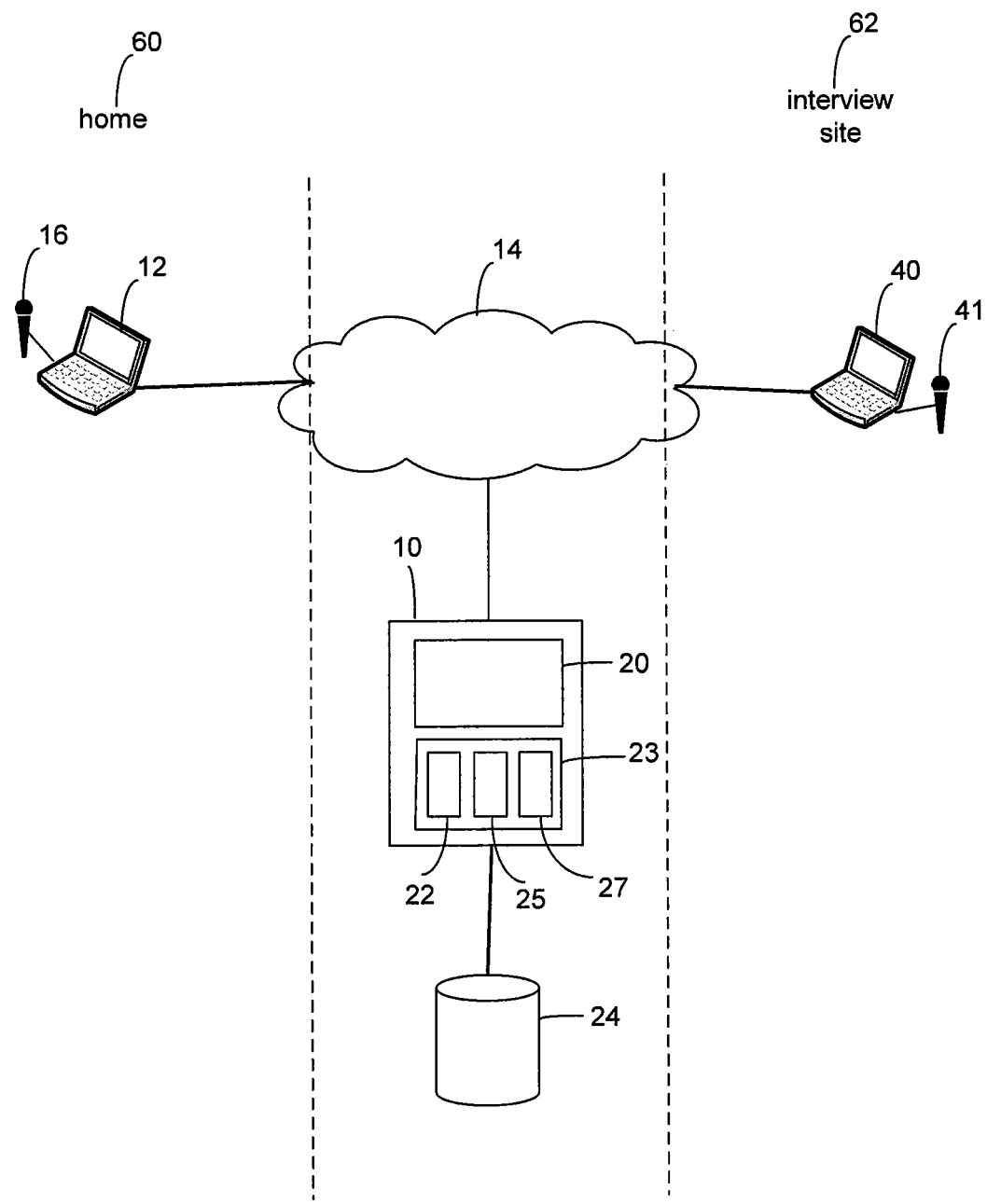
FIG. 2 is a schematic computer system diagram of this example.

A computer system diagram is provided in FIG. 2 that shows a server 10 that offers the testing of this example. The server 10 is accessed by computer 12 which is typically located at the candidates home 60 via the internet 14. The server 10 can also be accessed by a second computer 40 which is typically located at the location of the interview 62.

The first stage 50 is typically initiated by a candidate using their computer 12. The candidate wishes to apply 70 for employment and the application process requires a CAT be taken by the candidate.

In this example, using the computer 12 the candidate completes the CAT which is administered 72 by the server 10 over the internet 14. The computer 12 includes software such as an internet browser, that enables the computer to display the CAT as received from the server 10 on a display device of the computer 12. The computer 12 includes a sound capture device, such as a microphone 16, and other input devices such as a mouse and/or alphanumeric keypad (e.g. keyboard or touch screen displaying a keypad) that allow the candidate to answer questions that form the CAT.

The server 10 includes a testing module 20, which can be considered as a combination of software and hardware, including a processor, that is able to provide the content of the CAT to the computer 12.

In this example the CAT is presented to the candidate on a display device of computer 12, such as a monitor.

The candidate performs the CAT by answering a sequence of questions that are displayed, where each question in this example is designed with a certain difficulty level which varies and in turn requires a corresponding level of effort to answer. The answers typically include a combination of oral answers and mouse clicks. In some examples there is also keyed input. The candidate's answers which are received by the microphone and mouse input is sent by the computer 12 typically via a web browser session. Other input can include keyboard input. Each input is in time series order so that the input that forms the answer to the same question can be aligned. In some examples, the input is also time indexed or question reference indexed.

In some examples the answers received will be used as input to the testing module 20 to effect the selection of questions to provide to the computer 12.

The voice data and where appropriate mouse input data and keyboard input data received by the server 10 is provided to an identity verification module 23, which again can be considered a combination of hardware and software. In particular the voice data is provided to the voice assessment module 22, the mouse input data to the mouse assessment module 25 and the keyboard input data provided to the keyboard assessment module 27, where each module 22, 25 and 27 forms part of the assessment module 23 and are used to generate an identity signature of the user.

Figure 3A:
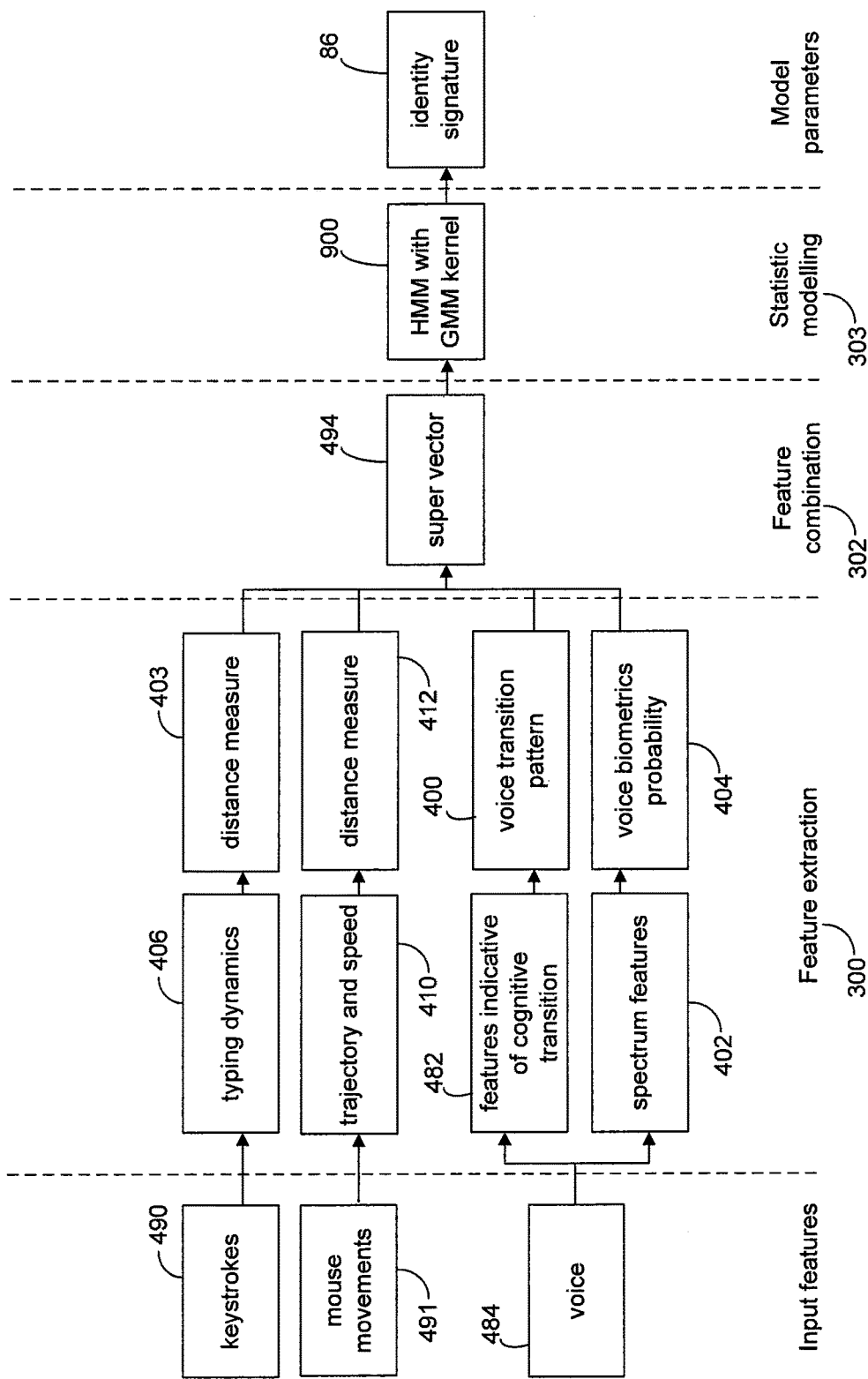
FIG. 3(a) is a flow diagram of the method of determining an identity signature.

Referring now to FIG. 3a, illustrating the internal structure of identity verification module 23 in signature generation mode, it can be seen that to generate the identity signature 86 the voice 484, keystrokes 490, and mouse movements 491 are modeled in three stages —feature extraction 300, feature combination 302, and statistical modelling 303. In feature extraction stage 300, input data are processed separately to extract identity related features, including the Euclidean distance measures derived from typing dynamics 406 and mouse moving trajectory/speed 410, as well as the voice biometrics probability 404 derived from spectrum features 402, and the voice transition patterns 400 derived from the features 482 which are indicative of cognitive transition. Then in feature combination stage 302 the features created in feature extraction stage 300 form a super vector 494, which in turn is modelled by a Hidden-Markov Model (HMM) with Gaussian Mixture kernel in statistical modelling stage. Finally an identity signature 86 is generated from the parameters of the HMM 900.

In particular, regarding the generation of voice transition pattern in feature extraction stage 300, the voice data 84 is automatically analysed to estimate 482 raw features that are indicative of voice transitions between different cognitive loads being:
pitch,
first formant,
second formant,
third formant,
glottal excitation, and
place of articulation.

These extracted raw features are also in the time sequence order.

The sequential patterns of each of the time series features demonstrate how an individual's voice transits when the amount of mental efforts put into the test changes and are referred to as voice transition patterns 200.

Figure 4:
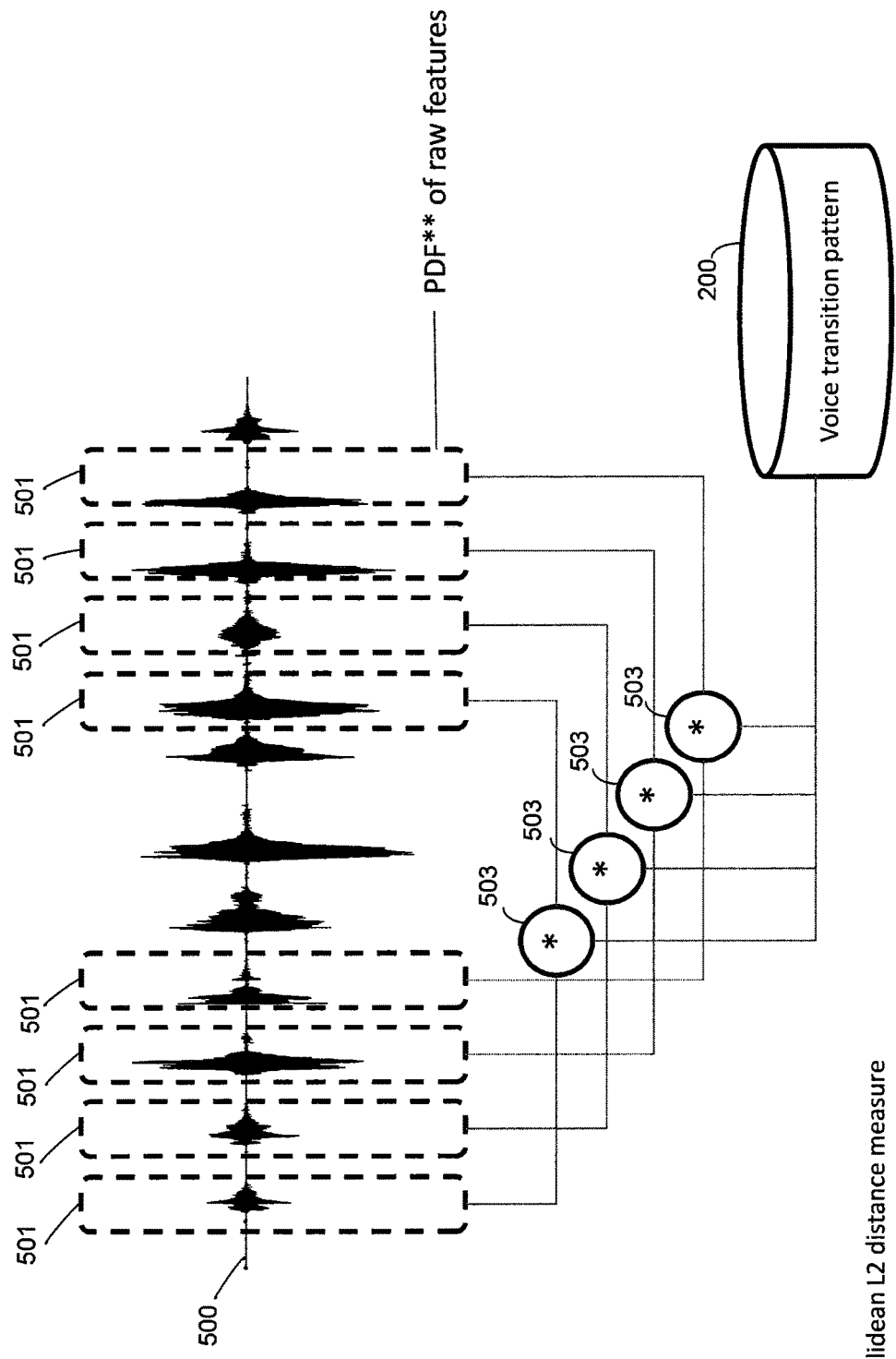
FIG. 4 is a flow diagram of the method of determining sequential features from transition patterns of the voice data.

An example of extracting the voice transition pattern from voice signals is shown in FIG. 4 where the sliding window in captured 501 along the waveform representative of the candidate's voice 500. The window defines a subset of the voice data. Since the cognitive load of the questions presented in the CAT increase, each time window 501 captures a segment of voice under a certain cognitive load level, increasing in this example from left to right. A Probability Density Function (PDF) is determined from each of the raw features within each window 501.

To determine a pattern in the transition features from low cognitive load to high cognitive load, pairs of PDFs across a certain time frame (e.g. seven times of the sliding window size) are compared. An Euclidean L2 distance measure is calculated from each of the PDF pairs 503, reflecting trend of voice feature distribution change while cognitive load changes.

The PDF can be compared using any suitable distance measure other than the Euclidean L2 distance measure. That means a measure is determined for each comparison of PDFs 501 of each feature. All the distance measures combined creates time-series distance vectors that form the sequential feature vector representing voice transition patterns 400 of the candidate under different cognitive loads.

In the same stage, other voice biometrics 404 is also applied to the standard spectrum features 402, such as Linear Predictive Coding (LPC) coefficients and Mel-Frequency Cepstral Coefficients (MFCC), which are also derived from the input voice 84. The parameters of standard voice biometrics features 404 are concatenated to form a time-series feature vector.

While keyboard and mouse inputs present in test, the patterns of these extra inputs can be used to enhance the identity verification. In case of keystrokes 490, typing dynamics 406 such as timing and hit-force are recorded and the distances among the combination of possible key sequences 403 are calculated from recorded data. Similarly, mouse movement input 491 is also analysed for trajectory and speed features 210 and in turn the distance between certain moves are derived 412. The value of distances measured are concatenated to form another time-series feature vector.

Then in feature combination stage 302, the feature vectors derived from the distance measures 403 and 412 from key stroke features 406 and from the collection of mouse movement features 410 respectively, the feature vector 400 derived from voice transition pattern, and the feature vector 404 of the standard voice biometrics features 402 are concatenated to create a high-dimensional super vector 494 as a time-series.

Figure 5:
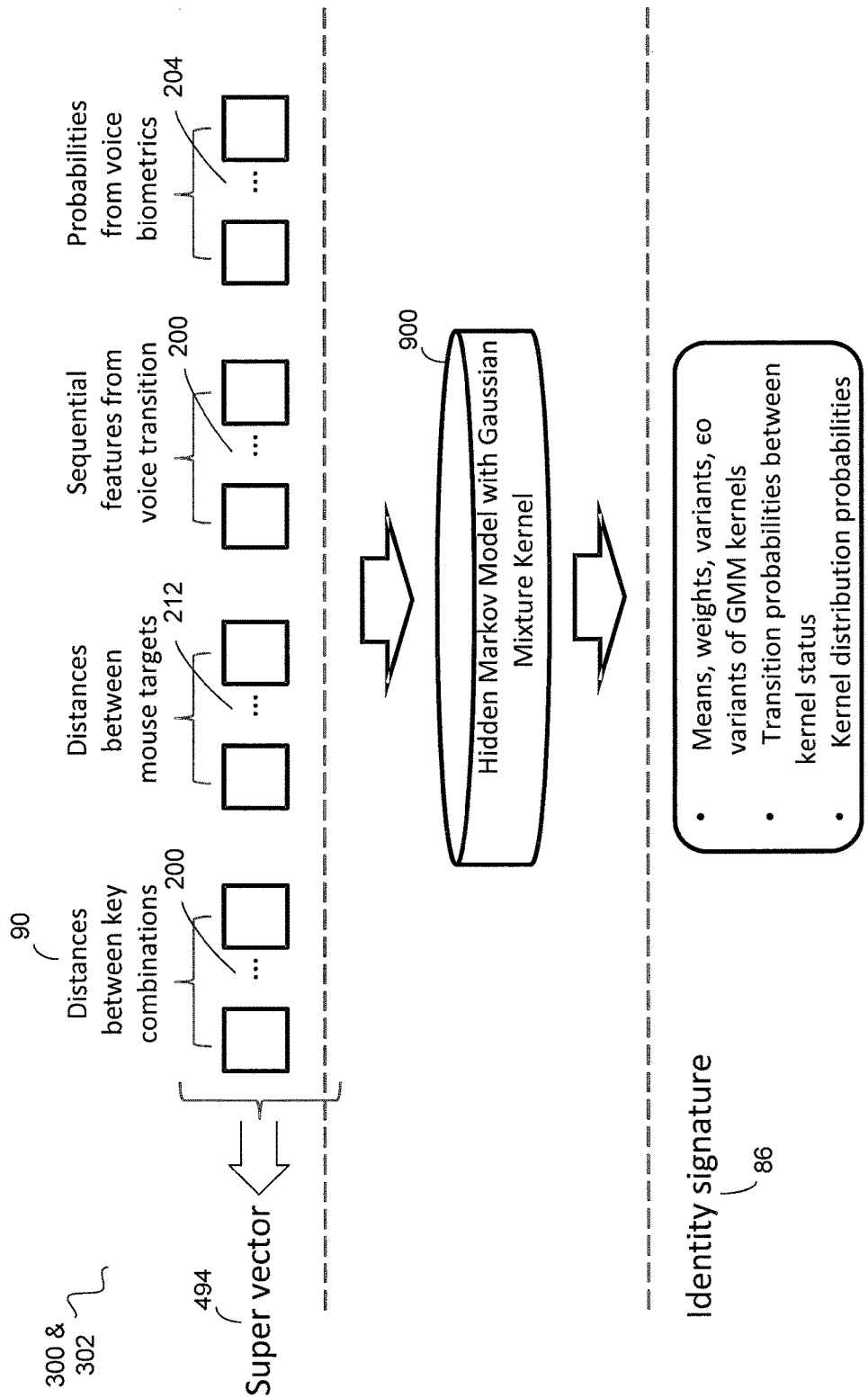
FIG. 5 is another flow diagram showing the method of determining an identity signature.

As shown in FIG. 5 the distribution of the collection of super vectors 494 from full-length test data is modelled 900 by Gaussian Mixture Models (GMM), followed by a Hidden Markov Model to capture the transition probabilities of certain patterns represented by GMMs.

The parameters of the resulting GMMs and HMM 86, including but not limited to:
Means, weights, co-variances of each GMM kernel
Frequencies and transition probabilities of kernel status in HMM represent the unique signature of an identity 86 who responds to cognitive tests in a specific way. Therefore the collection of these parameters can be defined as an identity signature 86 for a particular candidate.

That signature 86 is then stored in a datastore 24, that is computer storage 24 of the computer 12.

The testing module 20 also determines 74 a result of the CAT. That is, determines in real time whether the candidate's performance on the CAT is sufficient to move onto stage two 52. If so, the successful result is communicated 76 to the candidate, such as by display on the monitor once the CAT is complete or an email.

The second stage 52 uses the stored voice identity signature 86 to verify that the person appearing for the interview is the same person that conducted at the earlier time the CAT 72. The second stage 52 makes use of the discovery that the change of voice data received from a candidate during a specific cognitive task from a certain difficulty level to another is suitably unique and consistent. In particular, the change in the voice data of the candidate under different cognitive loads is consistent for a particular individual.

As a result the candidate can be asked to perform a shorter version of the CAT 78 as a verification test in a proctored setting to generate a new voice transition pattern, along with other identity features, that can be compared to the voice identity signature 86.

Again the candidate would use a computer 40 to perform the test 78 at the interview site 62. The features of the computer 40 are the same as computer 20, that is the computer is able to communicate with the server 10 via the internet 14 to deliver the test 78, displays the test on a monitor and receives input from the user as answers to the test 78, the input typically being voice data recorded from microphone 41 and as mouse movement data received by a mouse.

Again the test 78 is delivered by the testing module 20 of the server, and in response the voice input 84, together with keyboard and mouse data, is delivered to the identity verification module 23 which works in verification mode.

Figure 3B:
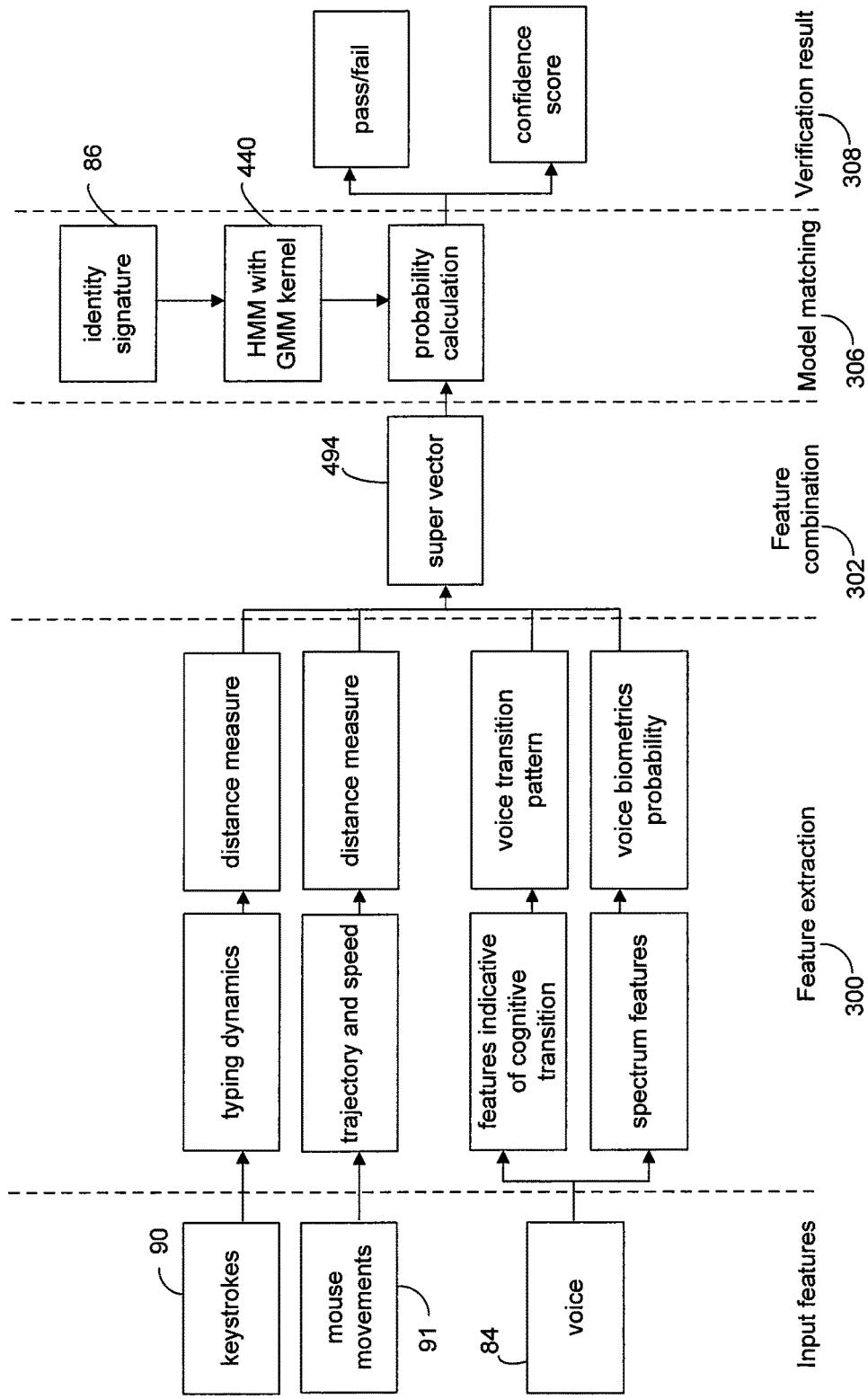
FIG. 3(b) is a flow diagram of the method of verifying a user using the identity signature.

FIG. 3b illustrates the verification process, which shares the same feature extraction 300 and feature combination 302 stages as described in FIG. 3(a). A set of super vectors 494 are determined for verification purposes and are stored in the datastore 24 and are then compared to the HMM model 440 which is re-constructed from the identity signature 86 created in earlier full-length test and stored in the datastore 24. The probability of the super vectors 494 from verification test follow the same statistical distribution as represented by the HMM is calculated in the model matching stage 306, and a verification result 308 of pass/fail associated with a confidence score is presented.

The verification result indicates that the persons taking the full-length test and short verification test are sufficiently or not the same. Then the candidate is taken to having passed 79 the verification test and proceed to the interview 75. Alternatively, they fail 77 the test which can lead to being disqualified 73 from progressing further in the selection process. The result of the verification test is also stored in the datastore 24.

Figure 6:
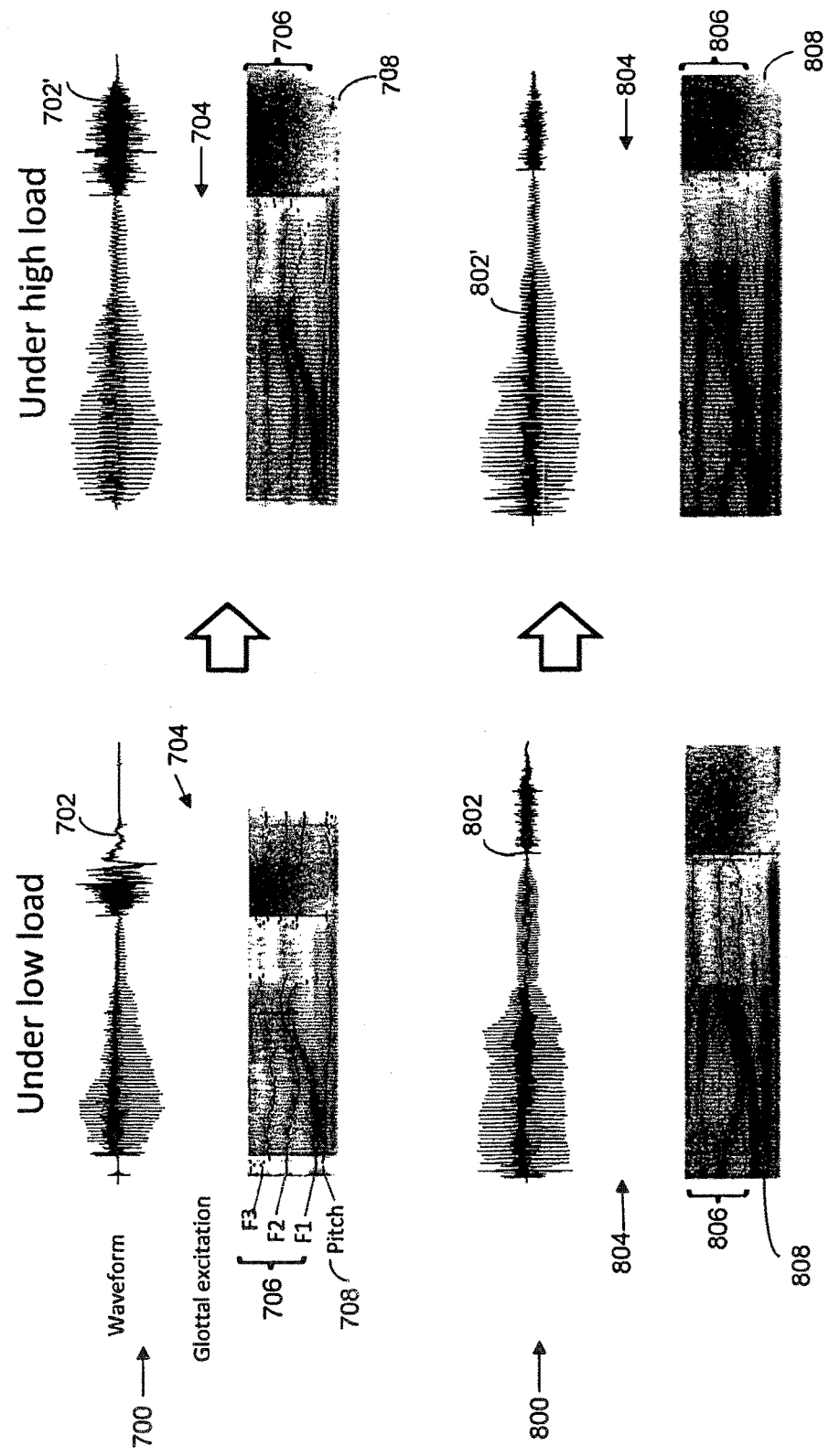
FIG. 6 shows a comparison of voice data of two candidates that both respond to questions with different difficulty levels.

An example of the voice data taken from two candidates under different conditions is shown in FIG. 6 when saying the word "orange". The waveform 702 of the voice data of candidate 700 is shown where the candidate is answering questions of different difficulty. On the left the waveform 702 is for an easy question suggesting a low cognitive load. Directly underneath the waveform 702 locations where the raw feature of glottal excitation is detected is marked. Further the first, second and third formant features 706 are also shown together with pitch 708.

The waveform 702' of the voice data of the candidate 700 is also shown in FIG. 6 where the candidate 700 is answering a difficult question and is therefore suggestive of a high cognitive load. Again, features of glottal excitation 704', formant features 706' and pitch 708' is also shown.

A similar example of a different candidate 800 is also shown in FIG. 6 under low 802 and high 802' cognitive load.

What can be seen from this representation is that the how these features associated with the same word change from low cognitive load to high is significantly different across two speakers. However, the exact change pattern of each speaker needs to be captured using a statistical model described above to identify.

It should be understood that various arrangement of computers 10 and 12 can be provided that will be able to perform stage one 50 or two 52. Software on computer 12 could be application software in which case modules 20 and 23 and the function of the datastore 24 of the server 10 could be incorporated into the computer 12

The user may be being tested for suitability to a role. For example the second stage 52 could be performed at enrolment for say an academic course rather than at the interview.

Other inputs that can be used include eye movements, biological sensors, pen gestures and pressures, such as input via a stylus or finger on a touch sensitive screen.

Computer systems have the necessary input out port to communicate over the internet.

In another example, the questions may be presented to the user over a phone.

The cognitive load associated with the question of the CAT may not be increasing sequential order. For example, the question may be presented in sets where in each set is presented sequentially, and the question in each set are in increasing cognitive load. However, the last question of a set may have a higher cognitive load than the first question of the next set. In this case, when comparing PDFs of windows to determine the voice transition pattern 200 the associated cognitive load of the windows will need to be determined to ensure that they have different cognitive load and that the windows are consistently compared as low to high or high to low to determine a pattern. For example, the time series voice data may have associated tags that indicate the question difficulty that is responded to at various time points in the voice data. The tags are also stored with the voice data and the tags are referenced when making the comparisons.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for verifying identity of a user, the method being performed with a computer including at least an input device, a processor and memory, the method comprising:

receiving, at the input device, time series voice data from the user speaking into the input device providing answers to a sequence of questions having decreasing or increasing levels of cognitive difficulty wherein cognitive difficulty is an indication suggestive of the cognitive load of the user in answering a question;

converting the answers into subsets of voice data;

analyzing the voice datasubsets for features comprising one or more of pitch, first, second, and third formants, glottal excitation, and place of articulation;

comparing one or more features of the voice data subsets, to identify transitions in the features of the voice data subsets corresponding to answers having an increased or decreased level of cognitive difficulty;

forming a voice transition pattern indicative of how the user's voice transitions between different cognitive loads by selecting transitions in the features of the voice data subsets;

storing the voice transition pattern of the user;

comparing the stored voice transition pattern of the user to a statistical Markov model which is based on an identity signature formed from a previously determined voice transition pattern of the same user to determine whether the stored voice transition pattern and the identity signature have a similar statistical distribution; and verifying the identity of the user if the statistical distributions are similar.

2. The method according to claim 1, wherein the sequence of questions form a proctored test of the user for suitability or qualification to a role that the user is being tested for.

3. The method according to claim 1, wherein each comparison of features includes at least, a first subset that corresponds to an answer to a question having a first level of cognitive difficulty and a second subset that corresponds to an answer to a question having a second level of cognitive difficulty, where the first level of cognitive difficulty is higher than the second level of cognitive difficulty.

4. The method according to claim 1, wherein comparing one or more features of the voice data subsets comprises determining a probability distribution function of one or more features of each subset.

5. The method according to claim 4, wherein comparing one or more features of the voice data subsets is based on a distance measure of the respective probability distribution function.

6. The method according to claim 5, wherein the distance measures are combined to form a time series vector.

7. The method according to claim 1, wherein the voice transition pattern includes a model of the transition pattern.

8. The computer implemented method according to claim 1, wherein the step of verifying the identity of the user comprises determining a likelihood score that the user previously responded to the first sequence of questions.

9. The method according to claim 1, wherein the previously determined voice transition pattern includes a model of the transition pattern.

10. The method according to claim 1, wherein the method further comprises receiving further data from the user while responding to the first sequence of questions, the further data being one or more of data representative of mouse, stylus or other pointing device movements, including pressure information, data representative of alphanumeric key input and data representative of biological features of the user.

11. The method according to claim 3, wherein the sequence of questions are in substantially increasing order of cognitive difficulty.

12. A non-transitory computer readable medium including computer readable instructions that when executed by a computer causes it to operate in accordance with the method according to claim 1.

13. A computer system including at least an input device, a processor and memory for verifying the identity of a user, the system comprising:

a sound capture device receiving voice data from the user speaking into the sound capture device answering a sequence of questions having decreasing or increasing levels of cognitive difficulty wherein cognitive difficulty, wherein cognitive difficulty is an indication suggestive of the cognitive load of the user in answering a question;

a voice assessment module forming a voice transition pattern indicative of how the user's voice transitions between different cognitive loads by converting the users answers into subsets of the voice data, analyzing the voice data subsets for features comprising one or more of pitch, first, second and third formants, glottal excitation, and place of articulation, comparing one or more features of the voice data subsets to identify transitions in the features of the voice data subsets corresponding to the answers having an increased or decreased level of cognitive difficulty and to select the transitions in the features of the voice data subsets;

a data store storing the voice transition pattern of the user; and a verification module comparing the stored voice transition pattern of the user to a statistical Markov model which is based on an identity signature formed from a previously determined voice transition pattern from the same user to determine whether the stored voice transition pattern and the identity signature represent a similar statistical distribution, and verifying the identity of the user if the statistical distribution is similar.

* * * * *